(12) United States Patent
Zhan et al.

(10) Patent No.: US 11,892,589 B2
(45) Date of Patent: Feb. 6, 2024

(54) METHOD AND APPARATUS FOR ENHANCED FORMATION POROSITY MEASUREMENT USING PULSED NEUTRON SOURCE AND DUAL-FUNCTION DETECTORS

(71) Applicant: CHINA PETROLEUM & CHEMICAL CORPORATION, Beijing (CN)

(72) Inventors: Sheng Zhan, Houston, TX (US); Jeremy Zhang, Houston, TX (US)

(73) Assignee: CHINA PETROLEUM & CHEMICAL CORPORATION, Beijing (CN)

( * ) Notice: Subject to any disclaimer, the term of this patent is extended or adjusted under 35 U.S.C. 154(b) by 233 days.

(21) Appl. No.: 17/453,252

(22) Filed: Nov. 2, 2021

(65) Prior Publication Data

US 2022/0252754 A1 Aug. 11, 2022

Related U.S. Application Data

(60) Provisional application No. 63/148,571, filed on Feb. 11, 2021, provisional application No. 63/148,573, filed on Feb. 11, 2021.

(51) Int. Cl.
*G01V 5/10* (2006.01)
*G01V 5/04* (2006.01)
(Continued)

(52) U.S. Cl.
CPC ............ *G01V 5/102* (2013.01); *E21B 47/017* (2020.05); *E21B 49/00* (2013.01); *G01V 5/045* (2013.01); *G01V 5/105* (2013.01)

(58) Field of Classification Search
CPC ........ G01V 5/045; G01V 5/102; G01V 5/105; G01V 5/14; E21B 47/017; E21B 49/00
See application file for complete search history.

(56) References Cited

U.S. PATENT DOCUMENTS

| 4,122,339 | A | 10/1978 | Smith, Jr. et al. |
| 5,349,184 | A | 9/1994 | Wraight |
| (Continued) | | | |

FOREIGN PATENT DOCUMENTS

| CN | 101501531 A | 8/2009 |
| CN | 108643890 A | 10/2018 |
| (Continued) | | |

*Primary Examiner* — Mark R Gaworecki
(74) *Attorney, Agent, or Firm* — NKL Law; Allen Xue

(57) ABSTRACT

Formation porosity is measured using a logging tool that has a pulsed neutron generator and multiple dual-function detectors that detect both neutrons and gamma rays. Ratios of thermal neutrons, epithermal neutrons, and capture gamma rays from multiple detectors are utilized to obtain multiple neutron porosities and multiple gamma-ray porosities within different depth of investigations. The neutron porosity and the gamma-ray porosity may be further corrected by excluding peak areas attributable to hydrogen and/or chlorine to reduce the shale effect and/or the chlorine effect. The neutron porosity and the gamma-ray porosity may be combined to provide improved porosity evaluations within different depth of investigations into the formation in the entire porosity measurement range (0-100 p.u.).

16 Claims, 10 Drawing Sheets

(51) Int. Cl.
 *E21B 47/017* (2012.01)
 *E21B 49/00* (2006.01)

(56) References Cited

U.S. PATENT DOCUMENTS

| | | | |
|---|---|---|---|
| 5,521,378 A * | 5/1996 | Roscoe | G01V 5/101 |
| | | | 250/269.6 |
| 7,633,058 B2 | 12/2009 | Stoller et al. | |
| 8,598,510 B2 | 12/2013 | Zhang et al. | |
| 8,849,573 B2 | 9/2014 | Zhang et al. | |
| 10,061,056 B2 | 8/2018 | Moake | |
| 2006/0192096 A1 | 8/2006 | Radtke et al. | |
| 2008/0308720 A1 | 12/2008 | Ferguson | |
| 2009/0045329 A1 | 2/2009 | Stoller | |
| 2011/0112810 A1 | 5/2011 | Scoullar et al. | |
| 2011/0224906 A1 | 9/2011 | Zhang et al. | |
| 2012/0126106 A1 * | 5/2012 | Zhou | G01V 5/104 |
| | | | 250/269.6 |
| 2012/0197529 A1 | 8/2012 | Stephenson et al. | |
| 2012/0326048 A1 * | 12/2012 | Nikitin | G01V 5/125 |
| | | | 250/393 |
| 2013/0206972 A1 | 8/2013 | Zhou et al. | |
| 2014/0001350 A1 | 1/2014 | Beekman et al. | |
| 2014/0339410 A1 * | 11/2014 | Zhou | G01V 5/108 |
| | | | 250/256 |
| 2014/0343856 A1 * | 11/2014 | Zhou | E21B 47/11 |
| | | | 702/8 |
| 2016/0024909 A1 | 1/2016 | Han et al. | |
| 2016/0154141 A1 | 6/2016 | Moake | |
| 2016/0349399 A1 * | 12/2016 | Zhou | G01V 5/102 |
| 2017/0045639 A1 * | 2/2017 | Zhou | G01V 5/102 |
| 2017/0176635 A1 | 6/2017 | Kramer | |
| 2017/0211382 A1 | 7/2017 | Jacobson et al. | |
| 2017/0315260 A1 | 11/2017 | Stoller | |
| 2017/0362931 A1 | 12/2017 | Homan et al. | |
| 2018/0164469 A1 | 6/2018 | Kuespert | |
| 2018/0172876 A1 | 6/2018 | Inanc et al. | |
| 2018/0231683 A1 | 8/2018 | Teague et al. | |
| 2019/0025454 A1 | 1/2019 | Galford | |
| 2022/0252755 A1 | 8/2022 | Zhan et al. | |

FOREIGN PATENT DOCUMENTS

| | | | |
|---|---|---|---|
| CN | 110454147 A | 11/2019 | |
| CN | 110612463 A | 12/2019 | |
| WO | 2012064797 A2 | 5/2012 | |
| WO | WO-2013148998 A1 * | 10/2013 | G01V 5/101 |

* cited by examiner

METHOD AND APPARATUS FOR ENHANCED FORMATION POROSITY MEASUREMENT USING PULSED NEUTRON SOURCE AND DUAL-FUNCTION DETECTORS

RELATED APPLICATIONS

This application claims the benefit of priority under 35 U.S.C. § 119 to U.S. Provisional Application No. 63/148,571, filed on Feb. 11, 2021, and U.S. Provisional Application No. 63/148,573, filed on Feb. 11, 2021, the entire contents of which are incorporated herein by reference.

BACKGROUND

1. Field of Technology

This disclosure provides methods and apparatus for logging earth formation from a borehole, particularly to methods and apparatus for providing formation porosity within different depth of investigations (DOI) into formation in the entire porosity measurement range (0-100 p.u.) by selecting and/or combining neutron porosity and gamma-ray porosity simultaneously obtained by using multiple dual-function detectors.

2. Description of Related Art

Nowadays formation porosity can be measured using a compensated neutron tool having a neutron source and two neutron detectors spaced at different distances from the source. The source can be an isotope neutron source (e.g., an Am—Be source). The neutron detectors can detect either thermal neutrons or epithermal thermal neutrons. Fast neutrons emitted from the neutron source are slowed down to thermal neutrons in the formation. Some thermal neutrons are captured by elements in the formation (i.e., thermal neutron capture), which produces gamma rays when the excited elements decay to their ground state (i.e., capture gamma rays). Other neutrons are scattered back to the detectors and get detected.

Downhole formations contain water ($H_2O$), gas ($CH_4$), and/or oil ($C_nH_{2n+2}$), all of which are rich in hydrogen. In contrast, common rock grains, such as limestone ($CaCO_3$), sandstone ($SiO_2$), dolomite ($CaMg(CO_3)_2$), do not contain a significant amount of hydrogen element. Since hydrogen is effective in capturing thermal neutrons, the higher the formation porosity is, the fewer thermal neutrons escape thermal capture and reach to detectors. Since the percentage of thermal neutrons to the total neutrons is higher at the far detector than at the near detector, the neutron count rate of the far detector is affected more than the neutron count rate of the near detector. Consequently, the ratio of count rate from the near detector to that of the far detector (near-to-far ratio) correlates positively with formation porosity. That is, the higher the near-to-far ratio is, the higher the formation porosity is, and vice versa. Further, the correlation between the ratio and the formation porosity is unique for a specific tool and a specific formation mineralogy (e.g., sandstone, limestone, or dolomite). One can correlate a specific ratio of count rate with the formation porosity.

It is also well known that the porosity measurement is affected by many near-wellbore environmental factors, such as borehole size, tool standoff, borehole salinity, temperature, pressure, etc. Consequently, various algorithms have been developed to correct those environmental effects. However, when the salinity (NaCl, KCl in fluid) is high in wellbore, mud filtrate, or formation fluid, more thermal neutrons are absorbed by chlorine (Cl) in the high salinity fluid. As a result, neutron count rate of the detector is reduced. Furthermore, since the percentage of thermal neutrons to the total neutrons is higher at the far detector than that at the near detector. The neutron absorption is more significant for the far detector than for the near detector. As a result, the count rate of the far detector is reduced to a greater extent than the near count rate of the near detector so that the near-to-far detector count ratio increases. Consequently, the apparent formation porosity increases. The artificial increase in the apparent formation porosity due to high salinity is generally referred to as the chlorine effect.

Presence of shale in the formation can also distort the apparent neutron porosity to the extent that the reading can be higher than 100 p.u. Shale contains a significant amount of clay-bound water and other minerals that affect both the slow-down and the adsorption of neutrons so that the neutron count rate is substantially reduced in shaly sand or shale. Since the count rate of the far detector is affected more than the count rate of the near detector, the near-to-far ratio increases. Therefore, the apparent neuron porosity readings in shaly sand or shale are generally higher than the actual porosity, which is known as the shale effect. In field applications, the chlorine effect and the shale effect can be so high that the formation porosity measurement is not reliable even after the corrections are made.

The amount of capture gamma rays is proportional to the population of thermal neutrons. Accordingly, formation porosity can also be measured by using the ratio of capture gamma-ray count rates. Further, formation porosity obtained based on capture gamma-rays also suffers from the shale effect and the chlorine effect. Gamma-rays porosity logging usually employs a pulsed neutron generator and two gamma ray detectors. In this case, the gamma rays from thermal neutron capture reactions can be separated from fast neutron inelastic scattering.

Accordingly, there is a need to develop methods and tools for porosity logging that reduces or avoids chlorine effect and/or shale effect, and to improve the accuracy in general.

SUMMARY OF DISCLOSURE

The present disclosure provides methods and apparatus for enhanced formation porosity measurement that may cover the entire porosity measurement range (0-100 p.u.). The apparatus has a pulsed neutron generator and multiple dual-function detectors that detect both neutrons and gamma rays. Multiple neutron porosity readings and gamma-ray porosity readings having different DOIs into formation are simultaneously obtained by using multiple dual-function detectors. The neuron porosities and gamma-ray porosities are then corrected and/or combined to obtain one or more formation porosities with improved accuracy.

One embodiment of the disclosure provides a method of evaluating downhole formation porosity. The method includes using a pulsed neutron generator and multiple dual-function detectors deplored in a wellbore to measure formation porosity. A deterministic solution is utilized to estimate the values of formation porosities within different DOIs in the entire measurement range by selecting and/or combining neutron porosities and gamma-ray porosities simultaneously obtained by using multiple dual-function detectors.

Another embodiment of the disclosure provides an apparatus configured to evaluate downhole formation porosity.

The apparatus contains of a pulsed neutron generator and multiple dual-function detectors capable to detect both neutrons and gamma rays.

This disclosure further provides a method of evaluating downhole formation porosity. The method includes the steps of: emitting neutron pulses from a pulsed neutron tool deployed in a wellbore to irradiate earth formation surrounding the wellbore; detecting neutrons and gamma rays using a plurality of detectors disposed in the pulsed neutron tool; and estimating a plurality of neutron porosities and a plurality of gamma-ray porosities based on data from the plurality of detectors. The detectors in the pulsed neutron tool are dual-function detectors operable to detect neutrons and gamma rays from the formation.

In some of the embodiments, neutrons detected by the plurality of detectors are selected from thermal neutrons, epithermal neutrons, or a mixture thereof, while gamma rays detected by the plurality of detectors are inelastic gamma rays, capture gamma rays, or a mixture thereof. Signals from neutron and a signal from gamma rays detected by the detector are separated by applying a pulse shape discrimination technique.

In some of other embodiments, the estimating step in the method includes: obtaining a neutron count rate and a capture gamma-ray count rate from each of the plurality of detectors; calculating a ratio of neutron count rate and a ratio of capture gamma-ray count rate between every two of the plurality of detectors so as to obtain a plurality of ratios of neutron count rate and a plurality of ratios of capture gamma-ray count rate; estimating a plurality of neutron porosities using the plurality of ratios of neutron count rate and/or estimating a plurality of gamma-ray porosities using the plurality of ratios of gamma-ray count rate.

In further embodiments, each of the plurality of neutron porosities is obtained using an algorithm, e.g., a polynomial function as shown in Equation 4 in this disclosure, having as an input a corresponding ratio of neutron count rate among the plurality of ratios of neutron count rate. Each of the plurality of gamma-ray porosities is obtained using an algorithm, e.g., a polynomial function as shown in Equation 11 in this disclosure, having as an input a corresponding ratio of gamma-ray count rate among the plurality of ratios of gamma-ray count rate.

In some other embodiments, each of the plurality of neutron porosities is obtained using a corrected ratio of neutron count rate, wherein the corrected ratio of neutron count rate is obtained by applying a correction factor to a ratio of neutron count rate, and the correction factor is a function of the plurality of ratios of neutron count rate, e.g., according to Equations 5-7 in this disclosure.

In still other embodiments, each of the plurality of gamma-ray porosities is obtained using a corrected ratio of gamma-ray count rate, wherein the corrected ratio of gamma-ray count rate is obtained by applying a correction factor to a ratio of gamma-ray count rate, and the correction factor is a function of the plurality of ratios of gamma-ray count rate, e.g., according to Equations 12-14 in this disclosure.

In one specific embodiment, the method is carried out using a pulsed neutron tool contains three detectors—a first, a second, and a third detectors. The method includes the steps of: obtaining a neutron count rate and a capture gamma count rate from each of the first detector, the second detector, and the third detector; calculating a first ratio of neutron count rate and a first ratio of capture gamma ray count rate between the first detector and the second detector, a second ratio of neutron count rate and a second ratio of capture gamma ray count rate between the second detector and the third detector, and a third ratio of neutron count rate and a third ratio of capture gamma ray count rate between the first detector and the third detector; calculating three neutron porosities using the first ratio of neutron count rate, the second ratio of neutron count rate, and the third ratio of neutron count rate, respectively; and/or calculating three capture gamma ray porosities using the first ratio of gamma ray count rate, the second ratio of capture gamma ray count rate, and the third ratio of capture gamma ray count rate, respectively.

The method optionally contains a correction step. One embodiment of the correction step is to correct the plurality of neutron porosities and the plurality of gamma-ray porosities by subtracting capture gamma-ray count rates attributable to hydrogen, chlorine, or both, e.g., according to Equation 15-20.

In further embodiments, the neutron porosity and the gamma-ray porosity are evaluated and combined to provide a formation porosity. In one such method, a value of a neutron porosity selected from the plurality of neutron porosities and a value of a corresponding gamma-ray porosity value selected from the plurality of gamma-ray porosities are compared. When the difference between the two values is less than or equal to a predetermined value, assigning the value of the neutron porosity as the formation porosity; when a difference between the two values is more than the predetermined value, assigning the value of the gamma-ray porosity as the formation porosity. The predetermined value can be any value in the range of 2% to 10%.

In another method, a value of a neutron porosity selected from the plurality of neutron porosities and a value of a corresponding gamma-ray porosity selected from the plurality of gamma-ray porosities are compared with a predetermined value. When the value of the neutron porosity is less than or equal to the predetermined value, the value of the formation porosity is equal to the value of the neutron porosity, and when the value of the gamma-ray porosity is larger than the predetermined value, the value of the formation porosity is equal to the value of the gamma-ray porosity. The predetermined value can be any value from 30 p.u. to 50 p.u., e.g., 30 p.u., 35 p.u., 40 p.u., 45 p.u., or 50 p.u.

In still a further method, the formation porosity is calculated according to a weight function of one of the plurality of gamma-ray porosities and one of the plurality of the neutron porosities, e.g., according to Equation 21.

BRIEF DESCRIPTION OF THE DRAWINGS

The teachings of the present invention can be readily understood by considering the following detailed description in conjunction with the accompanying drawings.

DETAILED DESCRIPTION OF THE DISCLOSURE

Figure 1A:
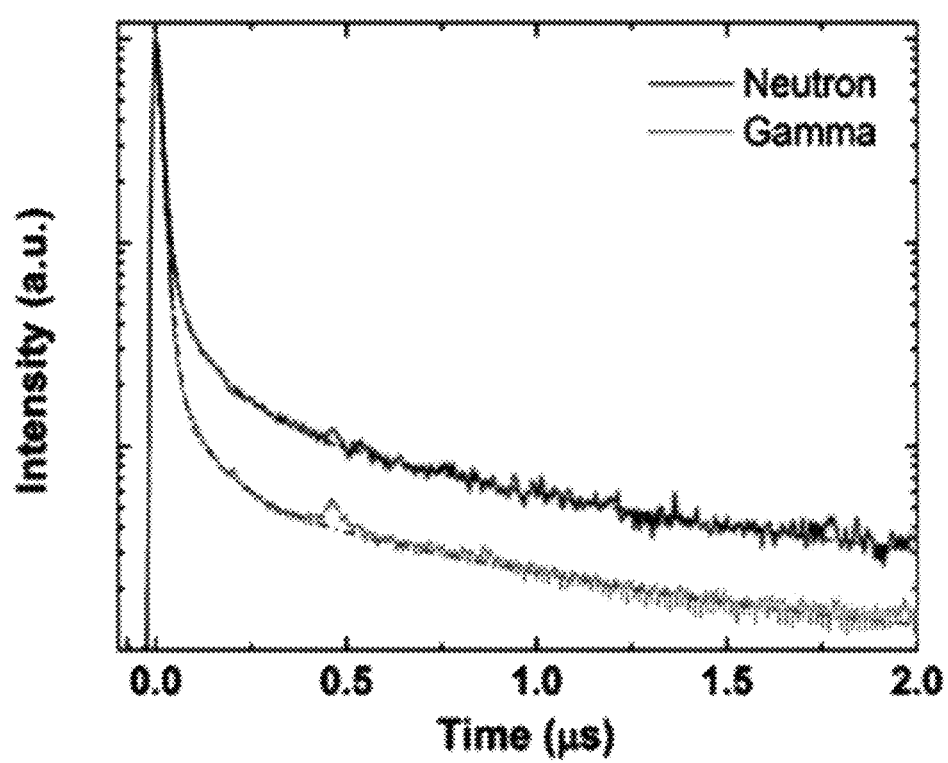
FIG. 1A shows gamma ray signals recorded by a detector decay faster than neutron signals decay.

The following detailed description is provided to assist the reader in gaining a comprehensive understanding of the methods, apparatuses, and/or systems described herein. References are made in detail to embodiments of the present disclosure, examples of which are illustrated in the accompanying drawings. Similar or like reference numbers may be used in the drawings and may indicate similar or like elements.

The features described herein may be embodied in different forms and are not to be construed as being limited to the embodiments described herein. Rather, the embodiments described herein and depicted in the drawings have been provided so that this disclosure will be thorough and complete and will convey the full scope of the disclosure to one of ordinary skill in the art, who may readily recognize from the following description that alternative embodiments exist without departing from the general principles of the disclosure.

Therefore, the scope of the disclosure is defined not by the detailed description, but by the claims and their equivalents, and all variations within the scope of the claims and their equivalents are to be construed as being included in the disclosure.

In oil and gas exploration, density, porosity, mineralogy, and gas/oil saturation are important formation parameters for evaluating the total oil/gas reserves in a field. Various wireline and LWD (Logging-While-Drilling) logging tools have been developed to obtain downhole formation parameters.

Formation density is obtained by measuring back-scattered gamma rays from a gamma radiation source (e.g., a Cs-137 source) received at two detectors (e.g., two NaI scintillation detectors) placed at different distances from the gamma ray source inside a density tool. The two detectors are usually referred to as the near detector and the far detector according to their relative distances from the gamma ray source.

Neutron porosity logging tools investigate the formation porosity by measuring the ratio of neutron count rates from a near detector to that of a far detector after fast neutrons from an isotope neutron source (e.g., an Am—Be source) have been slowed down by tool surroundings (e.g., wellbore fluid and formation) and scattered back to the detectors. The ratio is then translated to porosity according to a specific tool in a specific formation mineralogy (e.g., sandstone, limestone, or dolomite). Using the ratio of count rate from two detectors reduces the effect of variations in the near-wellbore environment (wellbore fluid, borehole size, etc.) on the porosity measurement.

A pulsed neutron tool employs a pulsed neutron source (e.g., a D-T neutron generator) and one, two, or three detectors that detect neutron-induced gamma rays. The energy spectrum of neutron-induced gamma rays from each element is unique. Therefore, by measuring the energy spectrum of gamma rays from inelastic scattering and/or from neutron capture reactions, one may identify elements and obtain the relative percentage of gamma rays from each of those elements in the formation, i.e., the elemental yields. The inelastic scattering energy spectrum is the basis for the carbon-oxygen (C/O) ratio log but the capture gamma-ray energy spectrum can also provide information on other elements, such as hydrogen (H), silicon (Si), calcium (Ca), iron (Fe), sulfur (S), and chlorine (Cl).

Since the elemental yield logs only provide the relative concentration of elements, they are normally presented as ratios, such as C/O, Cl/H, Si/(Si+Ca), H/(Si+Ca), and Fe/(Si+Ca). These ratios are indicators of oil, salinity, mineralogy, porosity, and clay, respectively. The elemental yield logs, together with cross sections of neutron inelastic scattering and neutron capture reactions of those elements, can also be used to obtain element concentrations in the formation.

Further, by measuring thermal neutron time-decay curve or capture gamma ray time-decay curve after a neutron pulse or several neutron pulses, one may obtain the macro thermal neutron absorption cross section (sigma) of the formation, which can be utilized to estimate oil/gas saturation.

In most of these applications, neutrons and gamma rays are detected by their respectively detectors/sensors. For example, He-3 gaseous detectors are used to detect thermal neutrons. He-3 isotope has high thermal neutron absorption cross sections. After fast neutrons emitted from a neutron source are slowed down by the formation and scattered back to the detectors, neutrons are absorbed and produce other detectable ions, such as protons (p) and trilliums (T), which ionize the gas. Ions and electrons are multiplied and drifted in an electric field to form electric signals. A variety of scintillation detectors, e.g., NaI, CsI, BGO, GSO, LaBr$_3$, YAP scintillators and photomultiplier tubes (PMTs), are employed to detect gamma rays. These scintillators change the deposited energy of gamma rays into scintillation lights. The PMT converts the scintillation lights into electrons and amplifies them to form electronic signals.

Existing pulsed neutron logging tools usually employ single-function detectors that detect either neutrons or gamma rays. For example, to obtain both formation density and neutron porosity, the traditional way is to combine a density tool and a neutron porosity tool together in the tool string. A density tool has a gamma ray source and two gamma ray detectors. A neutron porosity tool has a neutron source and two neutron detectors. As such, two different radiation sources and four radiation detectors would be required for formation density and neutron porosity measurements. To obtain other parameters such as gas saturation requires a third detector. Further, a neutron monitor detector may be needed to monitor the source strength of a neutron generator as the source strength may decrease or fluctuate over time. Accordingly, a pulsed neutron logging tool needs to carry multiple different types of radiation sources and detectors to measure multiple formation parameters. Such logging tools have limited use due to high cost, low reliability, and large size.

Figure 1B:
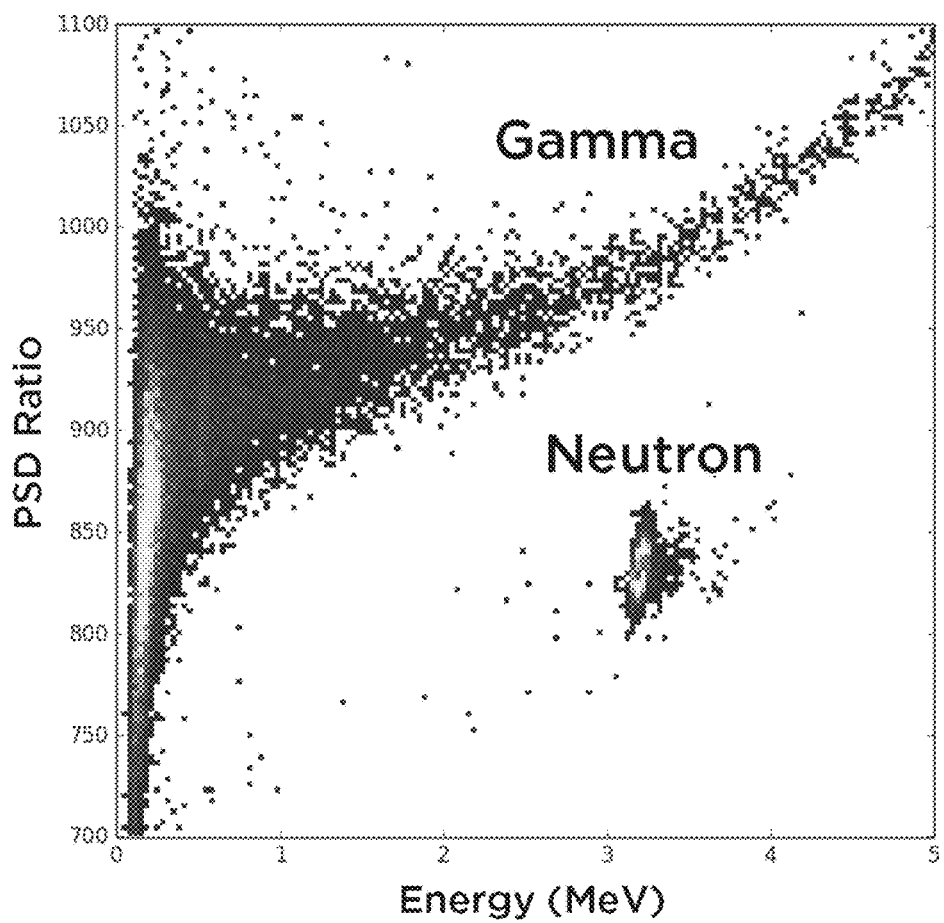
FIG. 1B illustrates the cross-plot of pulse shape discrimination (PSD) versus energy to separate neutrons and gamma rays.

More recently, scintillator materials that are sensitive to both neutrons and gamma rays, e.g., $Cs_2LiYCl_6$ (CLYC), $Cs_2LiLaBr_6$ (CLLB), have been developed. By coupling crystals of such a material to scintillation light sensitive components, such as PMTs, one can produce dual-function scintillators that detect both neutrons and gamma rays, hence dual-function detectors. Neutrons and gamma rays received by the dual-function detectors can be distinguished from each other using the pulsed shape discrimination (PSD) technique based on the fact that the electronic signal from a detector attributable to gamma ray decays faster than a neutron, shown in FIG. 1A and FIG. 1B.

Figure 9:
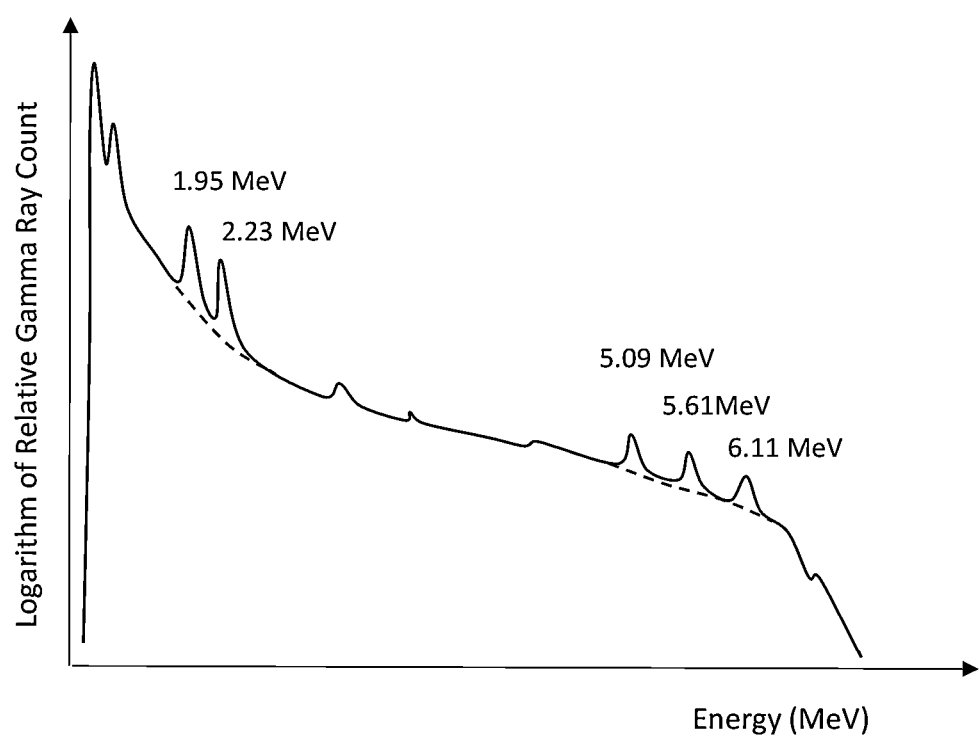
FIG. 9 illustrates how gamma-ray count from hydrogen and from chlorine are separated in the energy spectrum of capture gamma rays from a detector to correct the total capture gamma-ray count rate.

FIG. 9 shows a typical energy spectrum of capture gamma rays from a detector. It has peaks at about 1.95 MeV, 5.09 MeV, 5.61 MeV and 6.11 MeV from gamma rays attributable to thermal neutron captured on chlorine when the salinity is high and a peak at about 2.23 MeV from gamma rays attributable to thermal neutron capture on hydrogen. These peaks can be eliminated when calculating the total detector count rate of capture gamma rays.

In this disclosure, unless otherwise noted, a detector refers to a dual-function detector that can detect both neutrons and gamma rays. Such a detector employs a scintillation crystal such as $Cs_2LiLaBr_6$ (CLLB) and light sensitive device, e.g., a PMT. The detectors may be actively cooled or not actively cooled when being deployed downhole. For example, a detector using a CLLB crystal and a high-temperature PMT can be used at a high temperature without additional cooling devices. Further, a ratio or a count rate ratio(s) refer to a ratio between two count rates detected by two different detectors, which can be either two neutron count rate ratio(s) or two gamma-ray count rate ratio(s).

Figure 2A:
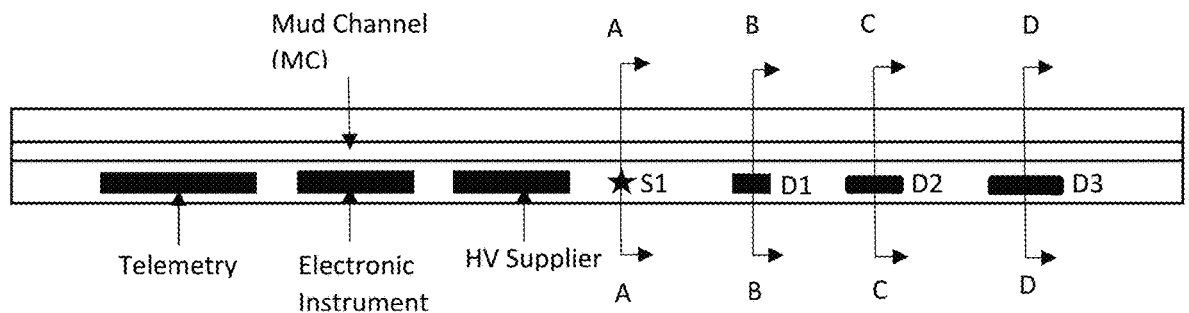
FIG. 2A, FIG. 2B, FIG. 2C, and FIG. 2D illustrate four exemplary configurations of a pulsed neutron logging tool having one neutron source (S1) and three detectors (D1, D2, and D3) disposed along the longitudinal direction of the housing of the tool.

FIGS. 2A to 2D are schematic illustrations (not to scale) of four exemplary configurations of a cylindrical pulsed neutron logging tool having a pulsed neutron source (S1) and three dual-function detectors (D1, D2, D3) disposed along the housing of the logging tool suitable for logging-while-drilling (LWD) operations. A mud channel (MC) is disposed along the axis of the logging tool while the detectors are eccentrically disposed along the longitudinal direction of the tool. FIG. 2A also shows a high voltage power supply (HV), an electronic instrument, e.g., a controller, for sending instructions, receiving, and processing data from the pulsed neutron source and the detectors, as well as a telemetry for transmitting data between the logging tool and surface. The high voltage power supplies provide HVs to detectors (D1, D2, D3) and to the pulsed neutron source (S1). The HV power supply, the electronic instrument, and telemetry are required but not shown in FIGS. 2B-2D for simplicity.

As shown in the figures, D1 is the near detector that has the shortest distance in longitudinal direction to the pulsed neutron source. D3 is the far detector having the longest longitudinal distance to the pulsed neutron source, and D2 is the middle detector that has a longitudinal distance that is in the middle.

Figure 2B:
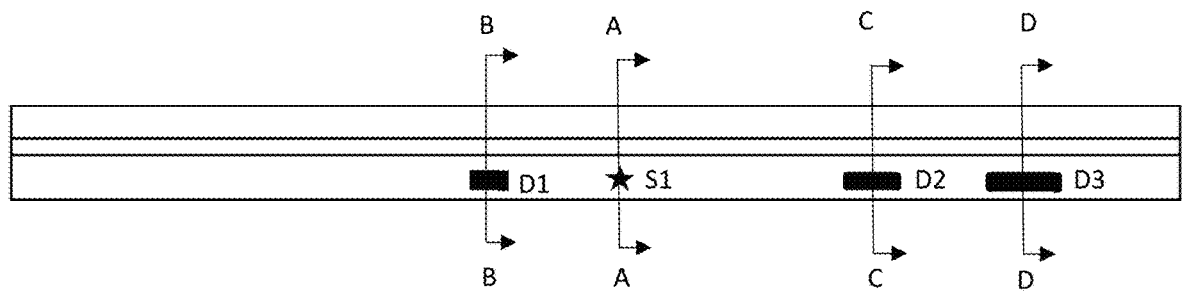
Figure 2C:
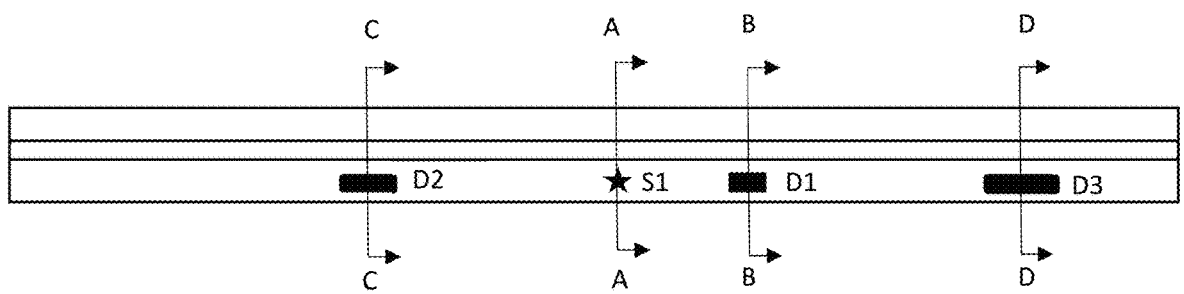
Figure 2D:
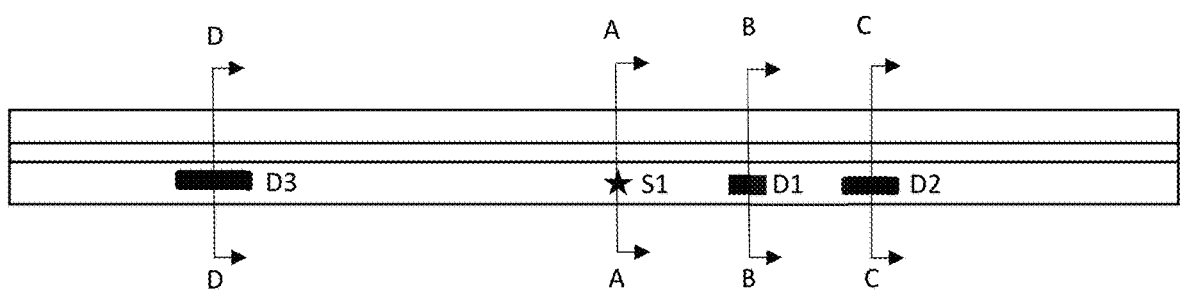

In FIG. 2A, all three detectors reside on one side of the pulsed neutron source along the logging tool. The one side can be either the proximal side or the distal side of the pulsed neutron source. The proximal side is the side of the pulsed neutron logging tool that is closer to the surface when it is deployed downhole while the distal side is farther away from the surface. The high voltage power supplies provide HVs to detectors (D1, D2, D3) and to the pulsed neutron source (S1). The signals from detectors are processed by the electronic instruments and measurements/data are collected and transmitted by telemetry. In FIGS. 2B, 2C, and 2D, both the distal side and the proximal side of the pulsed neutron source have at least one detector disposed thereto.

In wireline logging, the tool can be installed in a sonde, which does not contain a mud channel. Detectors can be installed either along or off the axis of the tool body. Power and control signals can also be provided to the logging tool from the surface while data from the logging tool can be transmitted to the surface via the wireline cable.

The pulsed neutron source S1 in each logging tool depicted in FIGS. 2A to 2D is a pulsed neutron generator. The pulsed neutron generator may be a Deuterium-Tritium (D-T) pulsed neutron generator, which can be operated in a variety of pulse schematics (e.g., frequency, duty time) in a pulse mode. For example, the frequency of neutron pulses may be about 10 kHz (the period is 100 μs) and the neutron duty time may be about 20 μs. In another embodiment, the frequency of neutron pulses may be about 1 kHz (the period is 1000 μs) and neutron duty time may be 50 μs. Depending on the methods and measurements, the D-T neutron generator may also be operated in a continuous mode. In that case, the neutron generator is activated frequent enough so that neutrons are emitted continuously. Neutrons from a D-T neutron generator has an initial energy of about 14.1 MeV.

The pulsed neutron source may also be a Deuterium-Deuterium (D-D) pulsed neutron generator, which can be operated in different pulse schematics (e.g., frequency, duty time) in pulsed mode. For example, the frequency of neutron pulses may be about 20 kHz (the period is 50 μs) and neutron duty time may be about 20 μs. Alternatively, the frequency of neutron pulses may be about 1 kHz (the period is 1000 μs) and neutron duty time may be 40 μs. Depending on the methods and measurements, the D-D neutron generator may also be operated in a continuous mode. Neutrons from a D-D neutron generator has an initial energy of about 2.5 MeV.

The neutron source S1 and detectors D1, D2, and D3 as depicted in FIGS. 2A-2D only show their relative positions along the longitudinal direction of the housing of the logging tool but not their positions in the radial direction in a cross-section of the tool housing.

Figure 3A:
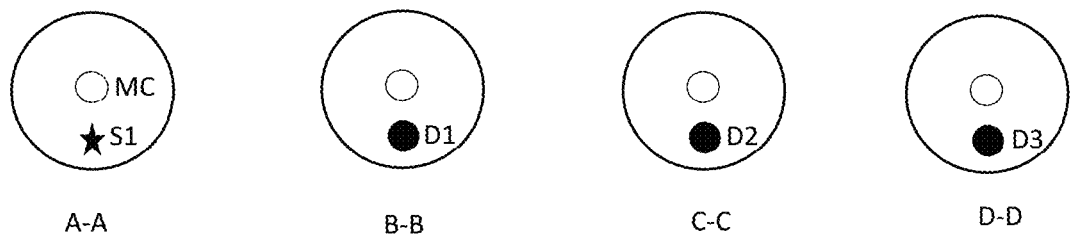
FIG. 3A, FIG. 3B, and FIG. 3C show cross-sectional views of exemplary pulsed neutron logging tools having S1, D1, D2, and D3.
Figure 3B:
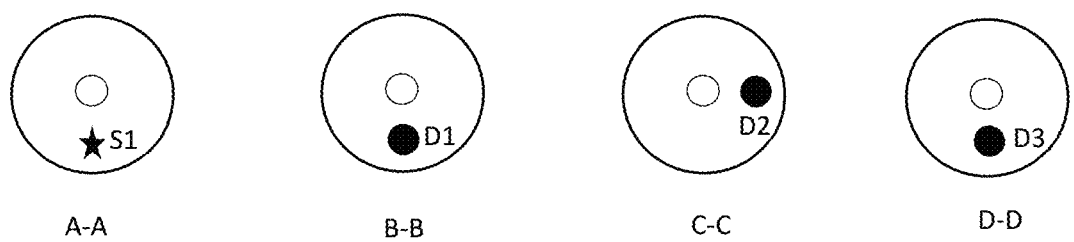
Figure 3C:
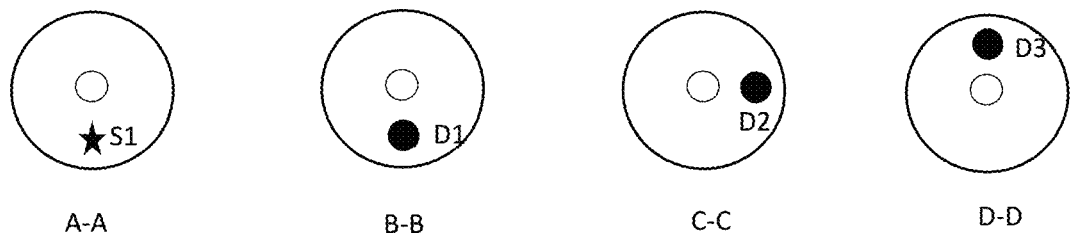

In certain embodiments, S1, D1, D2, and D3 can be disposed at the same radial or different radial directions, i.e., having the same or different toolface angles when deployed in the formation. FIGS. 2A, 2B, and 2C show exemplary cross-sectional views in the directions of A-A, B-B, C-C, and D-D as shown in FIGS. 2A to 2D. S1, D1, D2, and D3 in FIG. 3A are disposed at same toolface angle. In FIG. 3B, however, S1, D1, and D3 have the same toolface angle while D2 is at a different toolface angle. In FIG. 3C, S1 and D1 have the same toolface angle while each of D2 and D3 has a different toolface angle.

Figure 4A:
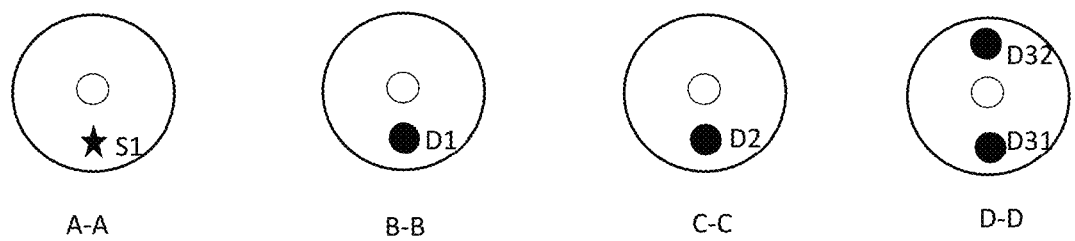
FIG. 4A and FIG. 4B show cross-sectional views of exemplary pulsed neutron logging tools having four (D1, D2, D31, D32) and six detectors (D1, D21, D22, D31, D32), respectively.
Figure 4B:
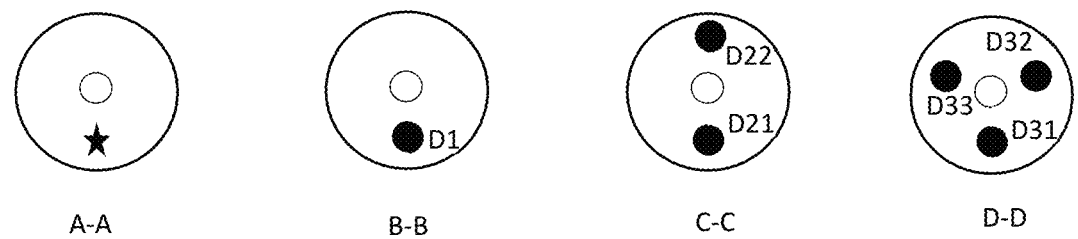

Other embodiments of the logging tool may have more than three detectors. For example, FIG. 4A depicts a variation of the logging tool in FIG. 2A that has four detectors —D1, D2, D31, and D32. D31 and D32 have approximately the same distance from S1 but are disposed at two different toolface angles. Likewise, FIG. 4B depicts another variation of tool in FIG. 2A, which has six detectors—D1, D21, D22, D31, D32, and D33. In this embodiment, D21 and D22 are disposed opposite to each other on the cross-sectional area of the logging tool, i.e., the toolface angle of D21 and D22 is 0° and 180°, respectively. D31, D32, and D33 are disposed 120° apart on the cross-sectional area of the logging tool, i.e., a difference in the toolface angles of any two among D31, D32, and D33 is 120°. Having different toolface angles allows detectors to preferentially receive neutrons and gamma-rays at certain incident angles from the formation. It also increases the detection efficiency of neutrons and gamma rays by increasing the total count rate of all the detectors.

Further, in FIG. 4A, D31 and D32 have substantially the same distance from S1. In FIG. 4B, middle detectors D21 and D22 have substantially the same distance from S1 while far detectors D31, D32, and D33 have substantially the same distance from S1. "Substantially the same distance" means the distances from S1 to the center of scintillators of the detectors (e.g., D31 and D32) is about the same. For example, the difference is less than ½" or ¼". By this arrangement, the middle detectors as a whole and far detectors as a whole have higher count rates than when only one middle detector or only one far detector is used. Accordingly, the pulsed neutron source S1 can be of a less powerful source, which may not be subject to stringent regulations as more powerful neutron sources are subject to. In addition, the count rate of individual detectors can separately be recorded and processed. The differences of various detectors in distance and in toolface angles can be used to obtain formation information in specific azimuthal directions.

In some embodiments, the logging tool have multiple shields that can absorb neutrons and gamma-rays (not shown). The shields can be placed in the logging tool between the neutron source and the detectors so that the detectors receive neutrons and gamma-rays coming from the formation rather than traveling through the logging tool itself. Alternatively, the detectors can also be partially shielded by the shield material that absorb neutrons and gamma rays from certain directions.

The shield is made of or contains one or more materials that can effectively attenuate both thermal neutrons and gamma rays. The shield material can contain materials chosen from heavy elements having high thermal neutron absorption cross sections, including metals such as gadolinium (Gd), samarium (Sm), metal oxides such as $Gd_2O_3$, $Sm_2O_3$, $B_2O_3$, alloys containing Gd or Sm with other heavy metals Fe, Pb, or W, or materials containing boron, such as tungsten borides (WB, $WB_2$, etc.).

The shield may be a stand-alone metal piece inserted in the logging tool, or an integral part of the detector casing. For example, the portion of the detector casing facing inward to the logging tool can be made of the shield material while the portion facing the formation is made of a material that is transparent to neutrons and gamma rays, forming a window that neutrons and gamma rays can travel through. As such, neutrons and gamma-rays from certain incident angles may be absorbed by the shield material while those travel through the window are received by the detector. Therefore, the detector can be more sensitive to certain incident angles by adjusting the size and orientation of the window in the detector casing. During operation, data collected by various detectors may produce direction-specific formation properties, which can be used to guide directional drilling.

Figure 5:
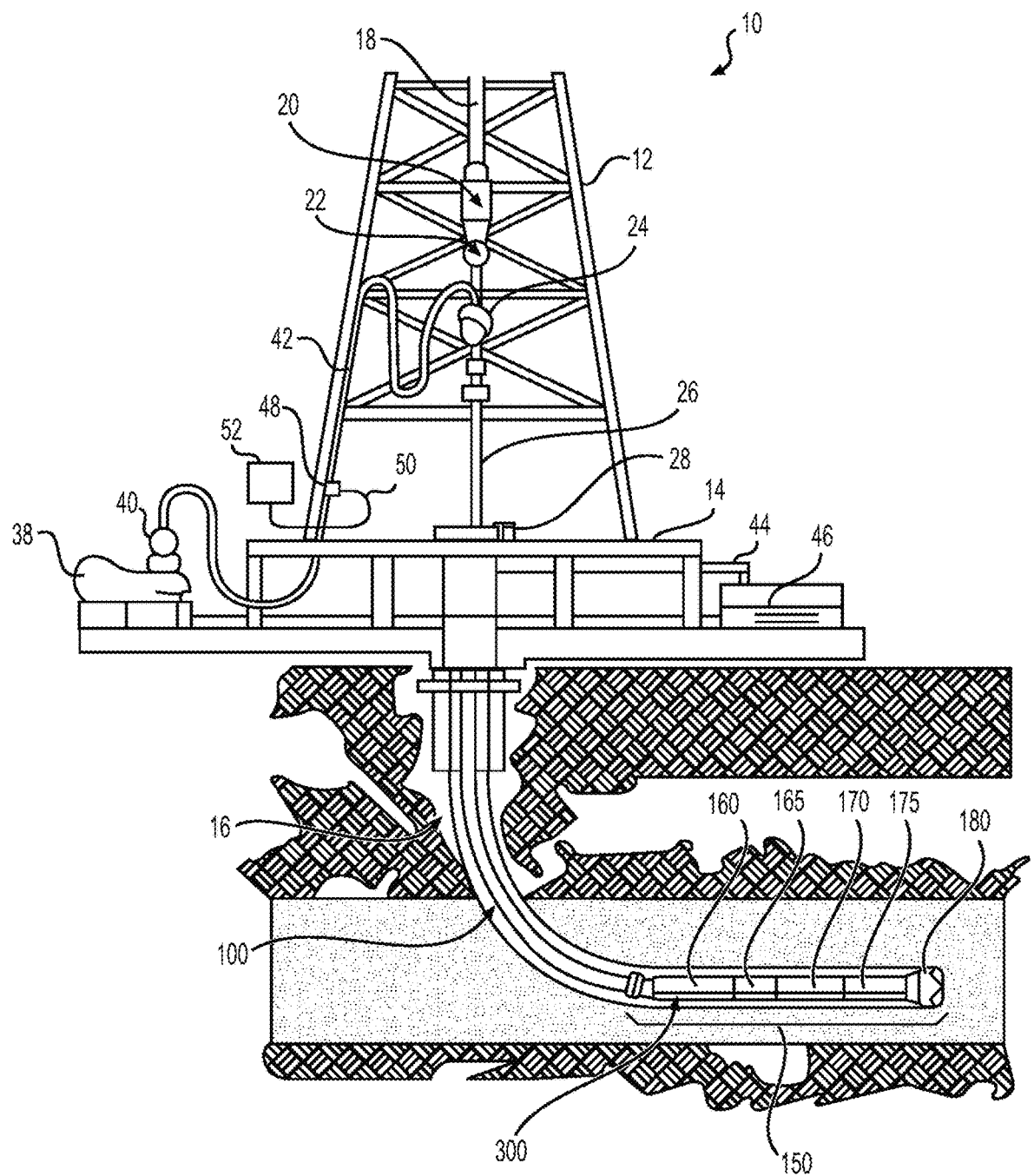
FIG. 5 is a block diagram of an exemplary drilling system that is suitable for implementing the present disclosure.

The logging tool can be a part of a wireline logging tool or be included in a downhole assembly as a LWD logging tool in a drilling operation. FIG. 5 is a diagram of an oil drilling system 10 used in the directional drilling of borehole 16. The oil drilling system 10 may be used for drilling on land as well as beneath the water. The borehole 16 is drilled into the earth formation using a rotary drilling rig that includes a derrick 12, drill floor 14, draw works 18, traveling block 20, hook 22, swivel joint 24, kelly joint 26 and rotary table 28. A drill string 100 includes a plurality of drill pipes that are serially connected and secured to the bottom of the kelly joint 26 at the surface. The rotary table 28 is used to rotate the entire drill string 100 while the draw works 18 is used to lower the drill string 100 into the borehole 16 and apply controlled axial compressive loads. The bottom whole assembly 150 is disposed at the distal end of the drill string 100.

The drilling fluid (also referred to as mud) is usually stored in mud pits or mud tanks 46, and is transferred using a mud pump 38, which forces the drilling fluid to flow through a surge suppressor 40, then through a kelly hose 42, and through the swivel joint 24 and into the top of the drill string 100. The drilling fluid flows through the drill string 100 at about 150 gallons per minute to about 600 gallons per minute and flows into the bottom whole assembly 150. The drilling fluid then returns to the surface by traveling through the annular space between the outer surface of the drill string 100 and the borehole 16. When the drilling fluid reaches the surface, it is diverted through a mud return line 44 back to the mud tanks 46.

The pressure required to keep the drilling fluid in circulation is measured by a pressure sensitive transducer 48 on the kelly hose 42. The pressure sensitive transducer detects changes in pressure caused by the pressure pulses generated by a pulser. The magnitude of the pressure wave from the pulser may be up to 500 psi or more. The measured pressure is transmitted as electrical signals through transducer cable 50 to a surface computer 52, which decodes and displays the transmitted information. Alternatively, the measured pressure is transmitted as electrical signals through transducer cable 50 to a decoder which decodes the electrical signals and transmits the decoded signals to a surface computer 52 which displays the data on a display screen.

As indicated above, the lower part ("distal part") of the drill string 100 includes the bottom hole assembly (BHA) 150, which includes a non-magnetic drill collar with a MWD system (MWD assembly or MWD tool) 160 installed therein, logging-while drilling (LWD) instrument sub 165 containing LWD instruments, a downhole motor 170, a near-bit measurement sub 175, and the drill bit 180 having drilling nozzles (not shown). The drilling fluid flows through the drill string 100 and is output through the drilling nozzles of the drill bit 180. During the drilling operation, the drilling system 10 may operate in the rotary mode, in which the drill string 100 is rotated from the surface either by the rotary table 28 or a motor in the traveling block 20 (i.e., a top drive). The drilling system 10 may also operate in a sliding mode, in which the drill string 100 is not rotated from the surface but is driven by the downhole motor 170 rotating the drill bit 180. The drilling fluid is pumped from the surface through the drill string 100 to the drill bit 180, being injected into an annulus between the drill string 100 and the wall of the borehole 16. The drilling fluid carries the cuttings up from the borehole 16 to the surface.

In one or more embodiments, the MWD system 160 may include a pulser sub, a pulser driver sub, a battery sub, a central storage unit, a master board, a power supply sub, a directional module sub, and other sensor boards. In some embodiments, some of these devices may be located in other areas of the BHA 150. One or more of the pulser sub and pulser driver sub may communicate with the pulser 300, which may be located below the MWD system 160. The MWD system 160 can transmit data to the pulser 300 so that the pulser 300 generates pressure pulses.

The non-magnetic drill collar houses the MWD system 160, which includes a package of instruments for measuring inclination, azimuth, well trajectory (borehole trajectory), etc. The pulsed neutron logging tool and associated electronic components may be located in LWD instrument sub 165. The pulsed neutron logging tool and other well logging instruments may be electrically or wirelessly coupled together, powered by a battery pack or a power generator driven by the drilling fluid. All information gathered may be transmitted to the surface via in the form of pressure pulses generated by the pulser 300 through the mud column in the drill string.

The near-bit measurement sub 175 may be disposed between the downhole motor 170 and drill bit 180. The pulsed neutron logging tool may alternatively be installed in the near-bit measurement sub 175 to provide more accurate real-time formation parameters to guide directional drilling. The data may be transmitted through the cable embedded in the downhole motor 170 to the MWD system 160 in the bottom whole assembly 150.

Figure 6:
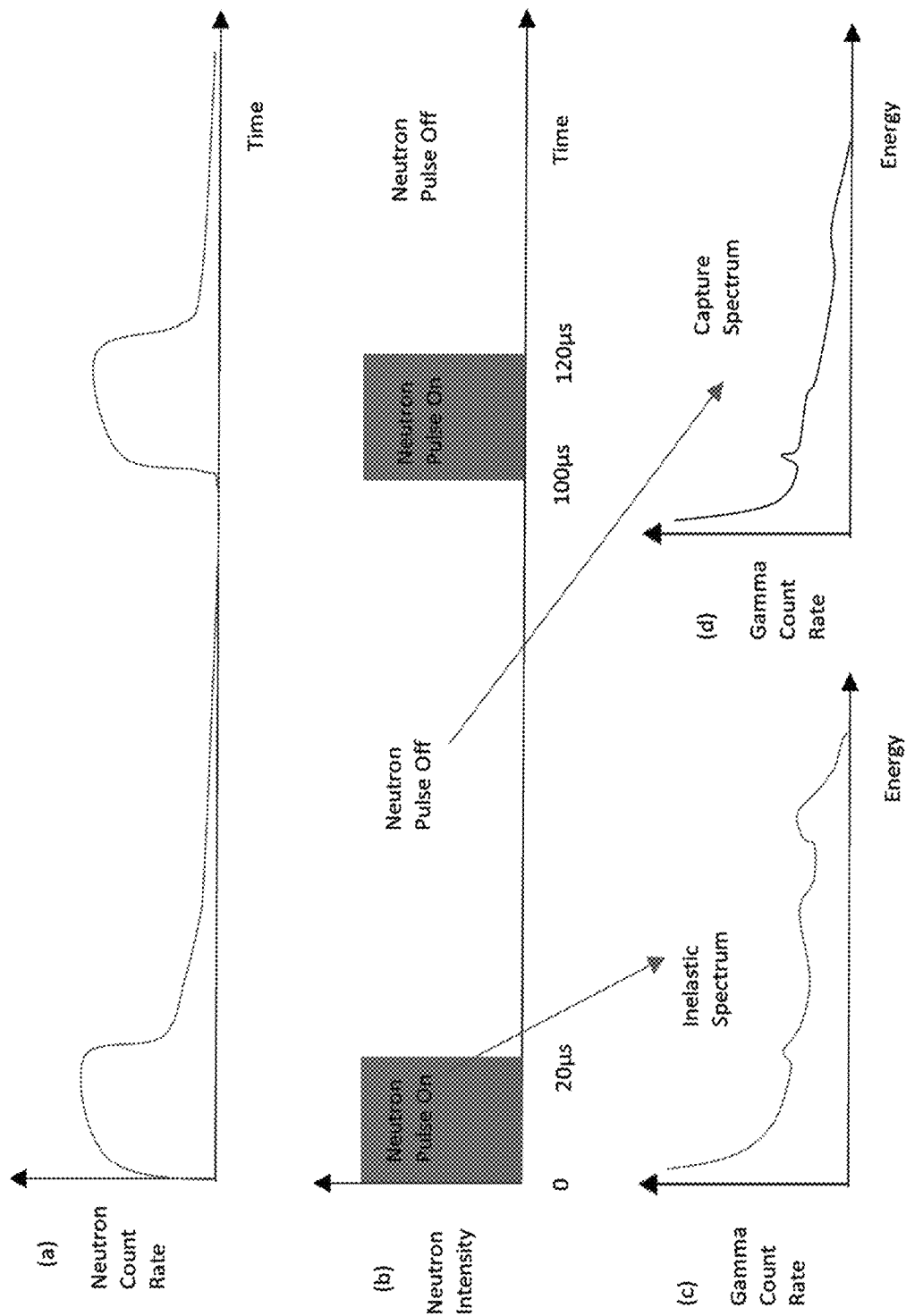
FIG. 6 shows schematics of neutron pulses, neutron count rates, as well as inelastic spectrum and capture spectrum of neutron-induced gamma rays.

In one embodiment of the current disclosure, a variety of formation parameters obtained using a logging tool having a D-T neutron generator and three dual-function detectors. FIG. 6 shows schematics of neutron pulses, neutron count rates, as well as inelastic spectrum and capture spectrum of neutron-induced gamma rays. The frequency of neutron pulses is 10 kHz (the period is 100 µs) and the neutron duty time is 20 µs, as shown in FIG. 6, panel (b).

The neutron count rates measured by the dual-function detectors, shown in FIG. 6, panel (a), are utilized to obtain formation porosity and other formation parameters. Neutrons from the dual-function detector may be further separated according to whether the neutron pulse is ON or OFF, which serves as a coincident or anti-coincident signal to neutrons from the three detectors so that during the neutron pulses (neutron pulse is ON), neutrons are recorded mainly as fast neutrons. Between the neutron pulses (neutron pulse is OFF), neutrons are recorded as thermal neutrons. Fast neutrons and thermal neutrons recorded at three detectors can be used to obtain fast neutron space distribution and thermal neutron space distribution. The neutrons from each detector may also be recorded together. In that case, all neutrons (from thermal neutrons to fast neutrons) are used to obtain the neutron space distribution.

Gamma rays from the dual function may be further separated according to whether the neutron pulse is ON or OFF, which serves as a coincident or anti-coincident signal to gamma rays from the three detectors so that during the neutron pulses (neutron pulse is ON), gamma rays are mainly recorded as inelastic spectrum, shown in FIG. 6, panel (c). Between the neutron pulses (neutron pulse is OFF), gamma rays are recorded as capture spectrum, shown in FIG. 6, panel (d). Proper time windows are selected so that most gamma rays measured in the capture time window are from thermal neutron capture reactions and most gamma rays measured in the inelastic time window are from fast neutron inelastic scattering.

Backgrounds at detectors may be measured while the neuron generator is OFF for some time and can be subtracted from the total signals of either neutrons or gamma rays. Neutron background measured during the neutron pulses may be further subtracted to get "pure" fast neutrons by using a small percentage of the measured neutrons between the neutron pulses. Similarly, the capture gamma rays measured during the neutron pulses may be further subtracted to get "pure" inelastic spectrum by using a small percentage of the measured capture spectrum between neutron pulses.

The capture gamma-ray count rates measured by the dual-function detectors after background subtraction can also be utilized to obtain formation porosity and other formation parameters.

In an exemplary embodiment, a logging tool having one neutron source and three dual function detectors—the near detector, the middle detector, and the far detector—is used to measure formation porosity ($\Phi$). FIG. 2A, 2B, 2C, or 2D are examples of such a logging tool. Further, the neutron source can be a pulsed neutron source or an isotope neutron source.

The logging tool is lowered into a wellbore to carry out pulsed neutron logging, either in a sonde for wireline logging or as a part of LWD instruction in a drill string. Each of the far, middle, and near detectors detects neutrons and neutron-induced gamma rays. Detector signals from neutrons and neutron-induced gamma rays are distinguished using a pulse shape discrimination (PSD) technique.

The neutron signals from the three detectors are then utilized to obtain the count rates of thermal neutrons and epithermal neutrons ($CRN_n$ for the near detector, $CRN_m$ for the middle detector, $CRN_f$ for the far detector), fast neutron count rates ($CRFN_n$ for the near detector, $CRFN_m$ for the middle detector, $CRFN_f$ for the far detector), thermal neutron count rates ($CRTN_n$ for the near detector, $CRTN_m$ for the middle detector, $CRTN_f$ for the far detector). During short neutron pulses, there are fast neutrons, epithermal and thermal neutrons, between neutron pulses, most neutrons are epithermal and thermal neutrons, However, the dual-function detectors are more sensitive to thermal and epithermal neutrons, so most neutrons detected by the detectors are thermal and epithermal neutrons. Therefore, either the count rate of thermal neutrons, epithermal neutrons, or thermal and epithermal neutrons from the dual-function detectors can be utilized obtain the formation porosity.

Thermal neutrons are neurons with a kinetic energy from about 0.025 eV (at room temperature) to 0.4 eV. Epithermal neutrons are neutron with kinetic energy from 0.4 eV to 10 eV. Fast neutrons are neutrons with kinetic energy higher than 1 MeV.

To measure epithermal neutrons, a thin layer of a thermal neutron absorber, such as cadmium (Cd) or gadolinium (Gd), can be used to wrap detectors so that thermal neutrons scattered back from the formation are absorbed before entering to the detectors.

The three ratios of the neutron count rates may be obtained according to according to Equations 1 to 3:

$$Rn_{m/f} = \frac{CRN_m}{CRN_f} \quad (1)$$

$$Rn_{n/f} = \frac{CRN_n}{CRN_f} \quad (2)$$

$$Rn_{n/m} = \frac{CRN_n}{CRN_m} \quad (3)$$

$Rn_{m/f}$ is the middle-to-far ratio, $Rn_{n/f}$ is the near-to-far ratio, and $Rn_{n/m}$ is the near-to-middle ratio. Since the three detectors are placed at different distances from the neutron source, they have different depth-of-investigations (DOI). As a result, the near-wellbore environments, such as borehole fluid, cement, etc., have different impacts on the three ratios. $Rn_{m/f}$ is more sensitive to the formation while $Rn_{n/m}$ is more sensitive to the near-wellbore material, such as the wellbore fluid.

Three neutron porosities—$\Phi_{n/m}$, $\Phi_{n/f}$, and $\Phi_{m/f}$, each having a different DOI, can be obtained by applying the three ratios—$Rn_{n/m}$, $Rn_{n/f}$, and $Rn_{m/f}$, respectively, to the ratio-to-porosity transform, shown in Equation 4, which can be a polynomial function of the ratios. The coefficients (a, b, c, d, e) of polynomial are different according to different formations being investigated, e.g., sandstone, limestone, or dolomite. The coefficients may be obtained through data fitting using porosities from formation core samples.

$$\Phi_n = f_1(Rn) = a + bR_n + cR_n^2 + dR_n^3 + eR_n^4 \quad (4)$$

where Rn can be one of the three ratios of total neutron count rates—$Rn_{n/m}$, $Rn_{n/f}$ and $Rn_{m/f}$.

The neutron porosity $\Phi_n$ can also be obtained by first using $Rn_{n/m}$ and/or $Rn_{n/f}$ to correct $Rn_{m/f}$, and then using the corrected middle-to-far ratio $Rnc_{m/f}$ to obtain the formation porosity. Equations 5 to 7 illustrate this algorithm.

$$Rnc_{m/f} = Rn_{m/f} + \Delta R \quad (5)$$

$$\Delta R = f_2(Rn_{n/m}, Rn_{n/f}, Rn_{m/f}) \quad (6)$$

$$\Phi_n = f_1(Rnc_{m/f}) \quad (7)$$

Equation 6 represents the calculation of the correction value $\Delta R$ by using all three ratios of total neutron count rates. $\Delta R$ is added to the middle-to-far ratio $Rn_{m/f}$ to obtain $Rnc_{m/f}$. Finally, $Rnc_{m/f}$ is used to calculate the neutron porosity $\Phi_n$, as shown in Equation 7. Alternatively, the corrections can be made to $Rn_{n/f}$ or $Rn_{n/m}$, which can be then used to calculate $\Phi_n$. Note that three $\Phi_n$ obtained based on Equations 1-4 or 5-7 have different DOIs.

In addition, rather than using the three ratios of neutron count rates, the formation porosity $\Phi$ can be calculated by using the ratios between capture gamma-ray count rates ($Rg_{n/m}$, $Rg_{n/f}$, $Rg_{m/f}$) from the three detectors for the gamma-ray porosity $\Phi_g$, according to algorithms shown in Equations 8 to 11 or Equations 12-14.

$$Rg_{m/f} = \frac{CRg_m}{CRg_f} \quad (8)$$

$$Rg_{n/f} = \frac{CRg_n}{CRg_f} \quad (9)$$

$$Rg_{n/m} = \frac{CRg_n}{CRg_m} \quad (10)$$

$$\Phi_g = f_3(R_g) = A + BR_g + CR_g^2 + DR_g^3 + ER_g^4 \quad (11)$$

wherein $R_g$ can be $Rg_{n/m}$, $Rg_{n/f}$ or $Rg_{m/f}$. The coefficients (A, B, C, D, E) of polynomial are different according to different formations being investigated, e.g., sandstone, limestone, or dolomite, and may be obtained through data fitting using formation core samples. Note that three neutron porosities are calculated according to Equation 4 using three different neutron count rate ratios while three gamma-ray porosities are calculated according to Equation 11 using three different gamma-ray count ratios. $\Phi_n$ and $\Phi_g$ are considered to be corresponding to each other when they are calculated using ratio between the same pair of detectors, e.g., both calculated using $R_{m/f}$.

$$Rgc_{m/f} = Rg_{m/f} + \Delta R \quad (12)$$

$$\Delta R = f_4(R_{m/f}, Rg_{n/f}, Rg_{n/m}) \quad (13)$$

$$\Phi_g = f_3(Rgc_{m/f}) \quad (14)$$

Equation 13 represents the calculation of the correction value $\Delta R$ by using all three ratios of capture gamma-ray count rates. $\Delta R$ is added to the middle-to-far ratio $Rg_{m/f}$ to obtain $Rgc_{m/f}$. Finally, $Rgc_{m/f}$ is used to calculate the gamma-ray porosity $\Phi_g$, as shown in Equation 14. Alternatively, the corrections can be made to $Rg_{n/f}$ or $Rg_{n/m}$, which can then be used to calculate $\Phi_g$. Note that each of three neutron porosities calculated based on Equations 5-7 also finds its corresponding gamma-ray porosity among the three gamma-ray porosities calculated based on Equations 12-14.

Among the three detectors, the near detector has the shallowest DOI, the middle detector has moderate DOI, and the far detector has the deepest DOI. Consequently, the neutron porosity obtained using $Rn_{n/m}$ is the shallowest, while those obtained using $Rn_{n/f}$ and $Rn_{m/f}$ has the moderate DOI and the deepest DOI, respectively. Likewise, DOIs of the gamma-ray porosity obtained using $Rg_{n/m}$, $Rg_{n/f}$, and $Rg_{m/f}$ are the shallowest, the moderate, and the deepest, respectively. These different porosities having different DOIs into formation can be utilized to evaluate near-wellbore environments, such as mud infiltration into formations.

The DOI of the pulsed neutron tool is heavily dependent on the source-to-detector distance and the porosity of formation. When the formation porosity is about 20 p.u., the DOIs of the near detector, the middle detector, and the far detector from thermal neutron measurement can be about 8 inches, 10 inches, and 12 inches, respectively. The DOIs of the near detector, the middle detector and the far detector from capture gamma ray measurement can be about 10 inches, 12 inches, and 15 inches, respectively.

$\Phi_n$ and $\Phi_g$ complement each other in porosity measurement. For example, $\Phi_n$ is more accurate at lower formation porosity (e.g., lower than 40 p.u., 35 p.u., or 30 p.u.) while $\Phi_g$ is more accurate at higher formation porosity (e.g., greater than 40 p.u., 45 p.u., or 50 p.u.). Furthermore, $\Phi_n$ tends to overestimate the porosity more than $\Phi_g$ does in high salinity environment or in shaly sand/shale. Therefore, the combination of $\Phi_n$ and $\Phi_g$ can achieve an improved porosity reading in a broader range (e.g., from 0 to 100 p.u.) of formation porosity in a variety of borehole and formation conditions.

Figure 7:
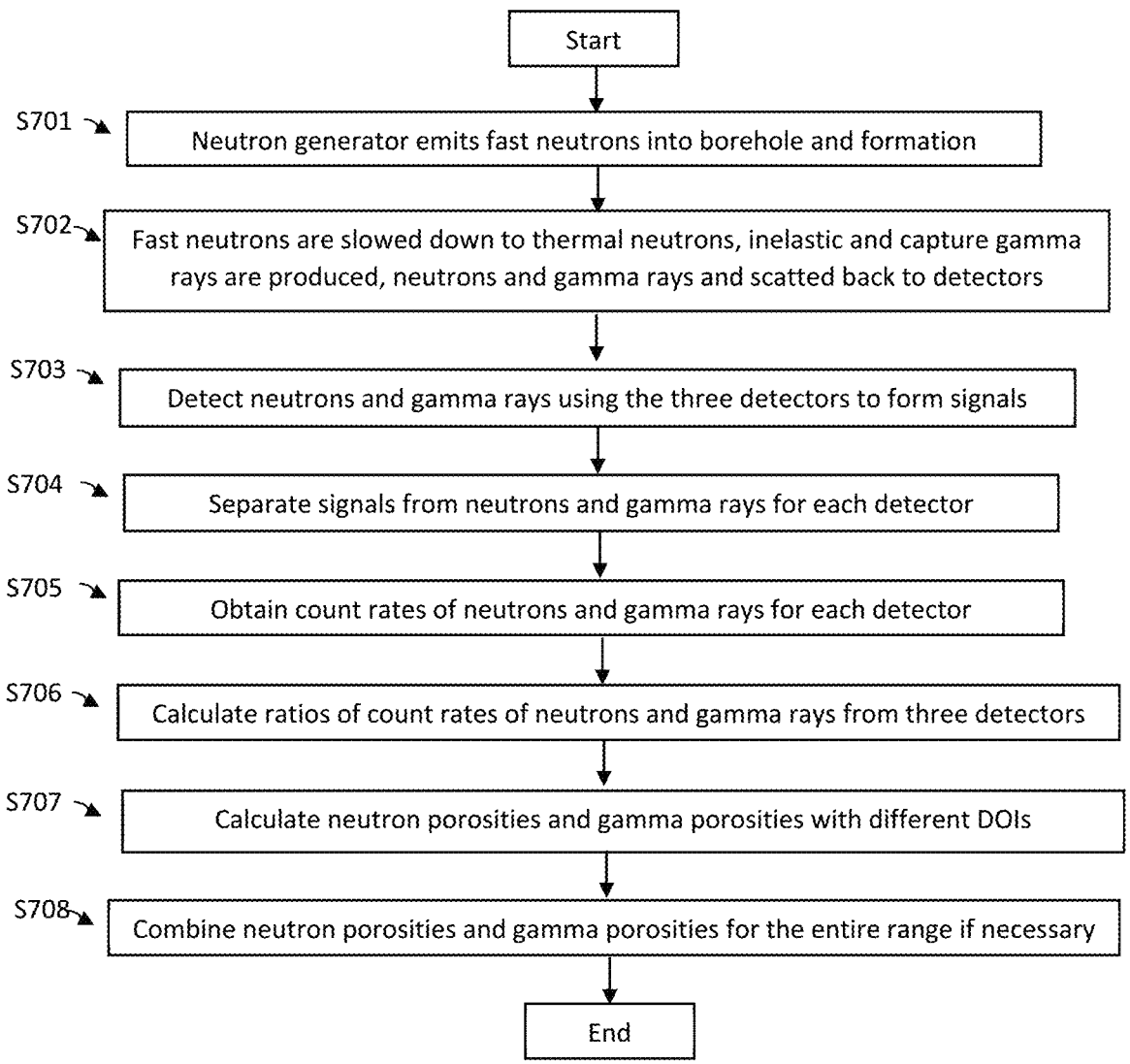
FIG. 7 shows a workflow for estimating formation porosity according to embodiments of the present disclosure.
Figure 8:
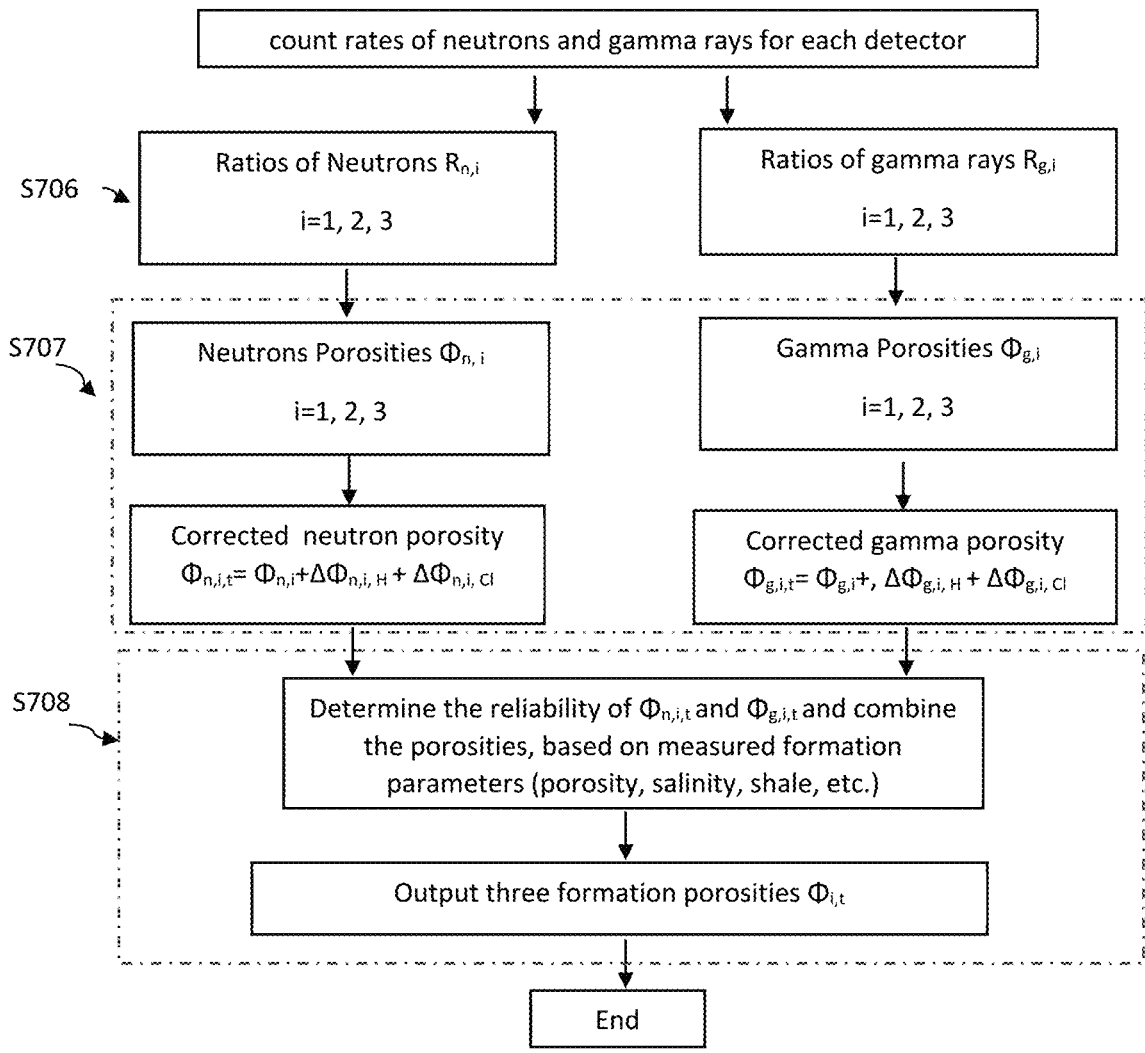
FIG. 8 illustrates details in S706 to S708 in the workflow of FIG. 7.

Workflow for obtaining improved formation porosities using logging tool having a pulsed neutron generator and three detectors is shown in FIG. 7. FIG. 8 provides details in S706 to S708 in this workflow. As shown in FIG. 7, in S701, fast neutron pulses emitted from a pulsed neutron generator enter borehole and formation. In S702, fast neutrons are slowed down to thermal neutrons by inelastic scattering or elastic scattering with the near-wellbore material. Some thermal neutrons are captured by elements in wellbore and formation, which produces capture gamma rays. In S703, some neutrons and gamma rays are scattered back to the three detectors and are detected. In S704, signals from each detector are separated according to neutron induced signals or gamma ray induced signals. In S705, count rates of either thermal neutrons, epithermal neutrons or both thermal neutrons and epithermal neutrons, and capture gamma rays are obtained for each detector.

FIG. 8 shows details in S706, S707, and S708 according to one of the embodiments. In S706, three ratios ($R_{n,i}$, i=1, 2, 3) between count rates of thermal neutrons, epithermal neutrons or both thermal and epithermal neutron.

In S707, both the neutron porosity and the gamma-ray porosity are calculated based on the count rate ratios. When the formation has high shale volume (containing clay bound water $H_2O$ and other minerals) or high salinity (containing NaCl and KCl), both the neutron porosity and the gamma-ray porosity are further corrected to obtain the corrected neutron porosity ($\varphi_{n,t}$) and the corrected gamma-ray porosity ($\varphi_{g,t}$).

FIG. 9 shows an exemplary energy spectrum for capture gamma-ray signals. The capture gamma-ray count rate under the 2.23 MeV hydrogen peak above the dotted line ($CR_H$) is attributable to clay-bound water in the shaly formation while the capture gamma-ray count rate under chlorine peaks at 1.95 MeV, 5.09 MeV, 5.61 MeV, and 6.11 MeV above the dotted line ($cR_{Cl}$) are attributable to high salinity, both of which inflates the gamma-ray count rate. $CR_H$ and $CR_{Cl}$ are calculated and used as inputs to algorithms to further correct the chlorine effect and the shale effect on the neutron porosity and the gamma-ray porosity, shown in Equations from 15 through 20.

$$\Delta\Phi_{n,H} = f_5(CR_H, \Phi_n) \quad (15)$$

$$\Delta\Phi_{n,Cl} = f_6(CR_{Cl}, \Phi_n) \quad (16)$$

$$\Phi_{n,t} = \Phi_n + \Delta\Phi_{n,H} + \Delta\Phi_{n,Cl} \quad (17)$$

$$\Delta\Phi_{g,H} = f_7(CR_H, \Phi_g) \quad (18)$$

$$\Delta\Phi_{g,Cl} = f_8(CR_{Cl}, \Phi_g) \quad (19)$$

$$\Phi_{g,t} = \Phi_g + \Delta\Phi_{g,H} + \Delta\Phi_{g,Cl} \quad (20)$$

Equation 15 provides a function that uses $cR_H$ and the initial value of neutron porosity $\Phi_n$ as inputs to calculate a correction value corresponding to the shale effect. Likewise, Equation 16 provides a function that uses $CR_{cl}$ and the initial value of neutron porosity $\Phi_n$ as inputs to calculate a correction value corresponding to the chlorine effect. The corrected neutron porosity $\Phi_{n,t}$ can be obtained according to Equation 17.

Equations 18 and 19 calculate correction values for gamma-ray porosity attributable to the shale effect and the chlorine effect, respectively. The corrected gamma-ray porosity $\Phi_{g,t}$ is then calculated according to Equation 20.

Even though S707 provides the correction step, the correction step is optional. If the shale effect or the chlorine effect is strong, one or both of them can be corrected according to the method illustrated above. If both the shale effect and the chlorine effect are weak and have little impact on the accuracy of the formation porosity, the correction step is not necessary and be bypassed.

In S708, $\Phi_{n,t}$ and $\Phi_{g,t}$ are assessed and combined to obtain the formation porosity. In one embodiment, $\Phi_{n,t}$ and $\Phi_{g,t}$ are compared to each other to select one value that better represents the formation porosity. For example, if the difference between the values of $\Phi_{n,t}$ and $\Phi_{g,t}$ is less than a predetermine percentage, the formation porosity is assigned the value of $\Phi_{n,t}$; if the difference is larger than the predetermined percentage, the formation porosity is assigned the value of $\Phi_{g,t}$. The predetermined percentage can be in the range of 2%-10%, e.g., 2%, 3%, 5%, 7%, or 10% In another embodiment, if the corrected porosity $\Phi_{n,t}$ and $\Phi_{g,t}$ is equal to or lower than a predetermined value, the formation porosity is assigned the value of the corrected porosity $\Phi_{n,t}$. If the corrected porosity $\Phi_{n,t}$ and $\Phi_{g,t}$ is equal to or higher than a predetermined value, the formation porosity is assigned the value of $\Phi_{g,t}$. The predetermined value can be in the range of 30 p.u. to 50 p.u., e.g., 30 p.u., 35 p.u., 40 p.u., 45 p.u., or 50 p.u.

In a further embodiment, the formation porosity is a weighted function of the corrected neutron porosity and the corrected gamma-ray porosity, as shown in Equation 21.

$$\Phi_t = w_1 \Phi_{n,t} + (1-w_1)\Phi_{g,t} \quad (21)$$

wherein $w_1$ and $(1-w_1)$ are associated weights for the corrected neutron porosity and the corrected gamma-ray porosity. The value of $w_1$ may be obtained by matching calculated porosity value with that from core analysis.

Further, all coefficients in the equations in this disclosure may be obtained by data fitting using empirical data such as those obtained from formation core analysis.

It should be noted that the method and apparatus of the present disclosure are not limited to the examples shown. The apparatus can have a pulsed neutron generator and more than three dual-function detectors that detect both neutrons and gamma rays. The method can provide improved formation porosities in the entire range from 0 to 100 p.u. within different DOIs into formation by correcting and/or combining neutron porosity and gamma-ray porosity. The porosity evaluation can be relatively free from chlorine effect and shale effect. Furthermore, the method can be used for obtaining formation porosity by using ratios of thermal neutrons, epithermal neutrons, or thermal and epithermal neutrons, and/or capture gamma rays. Moreover, the method can be used in both wireline and logging while drilling environments.

While in the foregoing specification this disclosure has been described in relation to certain preferred embodiments thereof, and many details have been set forth for purpose of illustration, it will be apparent to those skilled in the art that the disclosure is susceptible to alteration and that certain other details described herein can vary considerably without departing from the basic principles of the disclosure. In addition, it should be appreciated that structural features or methodologies shown or described in any one embodiment herein can be used in other embodiments as well.

What is claimed is:

1. A method of evaluating downhole formation porosity, comprising:
    emitting neutron pulses from a pulsed neutron tool deployed in a wellbore to irradiate earth formation surrounding the wellbore;
    detecting neutrons and gamma rays using a plurality of detectors disposed in the pulsed neutron tool, wherein each detector is operable to detect neutrons and gamma rays from the formation; and
    estimating a plurality of neutron porosities and a plurality of gamma-ray porosities based on data from the plurality of detectors,
    wherein the estimating step comprises:
        obtaining a neutron count rate and a capture gamma-ray count rate from each of the plurality of detectors;
        calculating a ratio of neutron count rate and a ratio of capture gamma-ray count rate between every two of the plurality of detectors so as to obtain a plurality of ratios of neutron count rate and a plurality of ratios of capture gamma-ray count rate; and
        estimating a plurality of neutron porosities using the plurality of ratios of neutron count rate and/or estimating a plurality of gamma-ray porosities using the plurality of ratios of gamma-ray count rate.

2. The method of claim 1, wherein neutrons detected by the plurality of detectors are selected from thermal neutrons, epithermal neutrons, or a mixture thereof.

3. The method of claim 1, wherein gamma rays detected by the plurality of detectors are inelastic gamma rays, capture gamma rays, or a mixture thereof.

4. The method of claim 1, wherein two or more detectors are disposed in the pulsed neutron tool.

5. The method of claim 4, wherein, for each detector, signals from neutrons and signals from gamma rays are separated by applying a pulse shape discrimination technique.

6. The method of claim 1, wherein each of the plurality of neutron porosities is obtained using an algorithm having as an input a corresponding ratio of neutron count rate among the plurality of ratios of neutron count rate.

7. The method of claim 1, wherein each of the plurality of gamma-ray porosities is obtained as an algorithm having as an input a corresponding ratio of gamma-ray count rate among the plurality of ratios of gamma-ray count rate.

8. The method of claim 1, wherein each of the plurality of neutron porosities is obtained using a corrected ratio of neutron count rate, wherein the corrected ratio of neutron count rate is obtained by applying a correction factor to a ratio of neutron count rate, and the correction factor is a function of the plurality of ratios of neutron count rate.

9. The method of claim 1, wherein each of the plurality of gamma-ray porosities is obtained using a corrected ratio of gamma-ray count rate, wherein the corrected ratio of gamma-ray count rate is obtained by applying a correction factor to a ratio of gamma-ray count rate, and the correction factor is a function of the plurality of ratios of gamma-ray count rate.

10. The method of claim 1, wherein the estimating step comprises:
calculating a first ratio of neutron count rate and a first ratio of capture gamma-ray count rate between a first detector and a second detector, a second ratio of neutron count rate and a second ratio of capture gamma-ray count rate between the second detector and a third detector, and a third ratio of neutron count rate and a third ratio of capture gamma-ray count rate between the first detector and the third detector;
estimating three neutron porosities using the first ratio of neutron count rate, the second ratio of neutron count rate, and the third ratio of neutron count rate, respectively; and/or
estimating capture gamma-ray porosity using the first ratio of gamma-ray count rate, the second ratio of capture gamma-ray count rate, and the third ratio of capture gamma-ray count rate, respectively.

11. The method of claim 1, wherein a first detector, a second detector, and a third detector are disposed in the pulsed neutron tool, and, wherein the method comprises:
obtaining a neutron count rate and a capture gamma count rate from each of the first detector, the second detector, and the third detector;
calculating a first ratio of neutron count rate and a first ratio of capture gamma ray count rate between the first detector and the second detector, a second ratio of neutron count rate and a second ratio of capture gamma ray count rate between the second detector and the third detector, and a third ratio of neutron count rate and a third ratio of capture gamma ray count rate between the first detector and the third detector;
calculating three neutron porosities using the first ratio of neutron count rate, the second ratio of neutron count rate, and the third ratio of neutron count rate, respectively; and/or
calculating three capture gamma ray porosities using the first ratio of gamma ray count rate, the second ratio of capture gamma ray count rate, and the third ratio of capture gamma ray count rate, respectively.

12. The method of claim 1, further comprising correcting the plurality of neutron porosities and the plurality of gamma-ray porosities by subtracting capture gamma-ray count rate attributable to hydrogen, chlorine, or both.

13. The method of claim 1, further comprising comparing a value of a neutron porosity selected from the plurality of neutron porosities to a value of a corresponding gamma-ray porosity value selected from the plurality of gamma-ray porosities, wherein, when a difference between the two values is less than or equal to a predetermined value, assigning the value of the neutron porosity as the formation porosity; when a difference between the two values is more than the predetermined value, assigning the value of the gamma-ray porosity as the formation porosity, wherein the predetermined value is in a range of 2% to 10%.

14. The method of claim 1, further comprising comparing a value of a neutron porosity selected from the plurality of neutron porosities and a value of a corresponding gamma-ray porosity selected from the plurality of gamma-ray porosities to a predetermined value, wherein, when the value of the neutron porosity is less than or equal to the predetermined value, the value of the formation porosity is equal to the value of the neutron porosity, and when the value of the gamma-ray porosity is larger than the predetermined value, the value of the formation porosity is equal to the value of the gamma-ray porosity.

15. The method of claim 14, wherein the predetermined value is between 30 p.u. to 50 p.u.

16. The method of claim 1, further comprising obtaining the formation porosity according to a weight function of one of the plurality of gamma-ray porosities and one of the plurality of the neutron porosities.

* * * * *